(12) United States Patent
Purdy

(10) Patent No.: US 9,650,740 B2
(45) Date of Patent: May 16, 2017

(54) PRESSING MAT

(71) Applicant: Kathryn Ann Purdy, Amarillo, TX (US)

(72) Inventor: Kathryn Ann Purdy, Amarillo, TX (US)

( * ) Notice: Subject to any disclaimer, the term of this patent is extended or adjusted under 35 U.S.C. 154(b) by 405 days.

(21) Appl. No.: 13/890,276

(22) Filed: May 9, 2013

(65) Prior Publication Data

US 2014/0150306 A1 Jun. 5, 2014

Related U.S. Application Data

(63) Continuation-in-part of application No. 12/555,796, filed on Sep. 8, 2009, now abandoned.

(51) Int. Cl.

| | |
|---|---|
| *D06F 83/00* | (2006.01) |
| *B32B 5/18* | (2006.01) |
| *B32B 5/24* | (2006.01) |
| *B32B 7/12* | (2006.01) |
| *B32B 21/02* | (2006.01) |
| *B32B 21/08* | (2006.01) |
| *B32B 21/10* | (2006.01) |
| *B32B 27/02* | (2006.01) |
| *B32B 27/08* | (2006.01) |
| *B32B 27/12* | (2006.01) |
| *B32B 27/14* | (2006.01) |
| *B32B 27/34* | (2006.01) |
| *B32B 27/40* | (2006.01) |

(Continued)

(52) U.S. Cl.
CPC ............... *D06F 83/00* (2013.01); *B32B 3/04* (2013.01); *B32B 5/18* (2013.01); *B32B 5/24* (2013.01); *B32B 7/12* (2013.01); *B32B 21/02* (2013.01); *B32B 21/08* (2013.01); *B32B 21/10* (2013.01); *B32B 27/02* (2013.01); *B32B 27/08* (2013.01); *B32B 27/12* (2013.01); *B32B 27/14* (2013.01); *B32B 27/34* (2013.01); *B32B 27/40* (2013.01); *D06F 85/00* (2013.01)

(58) Field of Classification Search
CPC .............. D06F 83/00; Y10T 442/3325; Y10T 442/3341; Y10T 442/335; Y10T 442/647; Y10T 442/649; Y10T 442/651
See application file for complete search history.

(56) References Cited

U.S. PATENT DOCUMENTS 2,326,062 A * 8/1943 Parker .............................. 38/139
4,360,984 A * 11/1982 Ruttenberg .................... 38/140
(Continued)

*Primary Examiner* — Andrew Piziali

(57) ABSTRACT

A pressing mat for ironing elements of material that can be placed on a support surface for ironing that includes a backing board layer and a composite material layer superimposed adjacent one another and secured together near the peripheral edges of each layer. The composite material layer has a foam layer and a fabric layer and is positioned such that the fabric layer is adjacent to the backing board layer with the foam layer providing an exterior surface. Alternatively, the pressing mat may be comprised of two pressing board assemblies superimposed adjacent to one another and secured together such that the backing board layers are adjacent to each other and the foam layers provide the exterior surface. In this alternative embodiment, the entire exterior surface of the pressing mat consists of the foam layer. The pressing mat may be configured for folding.

18 Claims, 2 Drawing Sheets

(51) Int. Cl.
*B32B 3/04* (2006.01)
*D06F 85/00* (2006.01)

(56) References Cited

U.S. PATENT DOCUMENTS

| | | | | |
|---|---|---|---|---|
| 5,974,980 A | * | 11/1999 | Kent | 108/42 |
| 6,212,801 B1 | * | 4/2001 | Kellogg et al. | 38/140 |
| 6,711,766 B2 | * | 3/2004 | Monk et al. | 5/420 |
| 2009/0142573 A1 | * | 6/2009 | Oh | 428/304.4 |

\* cited by examiner

PRESSING MAT

CROSS-REFERENCE TO RELATED APPLICATION

This application is a continuation application of Ser. No. 12/555,796 filed on Sep. 9, 2009

FIELD OF THE INVENTION

This invention relates to a pressing mat that can be used to iron fabric. In particular, the pressing mat assembly is used for ironing elements of fabric in various shapes and sizes that may be used for crafts, such as quilting and the like.

BACKGROUND

A variety of pressing mats, ironing boards, ironing pads and ironing board covers are available to provide individuals a means to press clothing, materials, and other items using a conventional iron. Many of these items are designed to allow items to be pressed in the home or on travel. Some of these items are specifically designed to be used in connection with quilting or other similar crafts.

In forming a quilt, it is common for multiple elements of fabric to be sewed or stitched together to create intricate patterns of material. Before sewing or stitching the elements, it is preferable to press such elements to ensure that the elements are properly sized and fitted together.

It is also desirable that the element being ironed be restrained so that the pressing operation may be performed quickly, easily, and thoroughly. In some routine household applications, the material being ironed is large enough that a restraint is not required to conduct the ironing process. For example, when a large piece of fabric such like a bed sheet is ironed, sufficient material is usually present to allow an individual to manually restrain the fabric by hand. However, in many crafting applications, the element being pressed is often so small in size or irregularly shaped that restraint of the item by hand is cumbersome. In these applications, it would be advantageous to have a simple means to restrain the element so that it can be pressed quickly, thoroughly, easily, and efficiently. To that end, it is desirable to have a pressing mat with the capability to restrain small and/or odd shaped elements of material desired to be pressed.

Some individuals enjoy crafting at home as well as on travel or have a limited work area available. Accordingly, it would be desirable for a pressing mat utilized for crafting applications to be portable and relatively small. Therefore, a small and lightweight pressing mat that provides a means to restrain the items being pressed would be advantageous in many applications.

It would also be advantageous for a pressing mat to have a self-restraining capability for use on hard surfaces, such as table tops and counter tops. This feature would be advantageous because it would increase the versatility of the pressing mat and allow for use in a variety of areas in the home and on travel.

It is also desirable that a pressing mat be easy and inexpensive to manufacture. To that end, it is desirable that a pressing mat be made from materials that are readily available, inexpensive, and simple to process.

It is also desirable that a pressing mat be capable of use with a standard ironing board assembly. This capability would enable users the option of implementing the unique features and benefits of a pressing mat on a standard ironing board to which they are accustomed.

Information relevant to attempts to address these problems can be found in U.S. Pat. Nos. 6,793,991 B2, 4,360,984, 4,043,062, 5,386,654, 4,621,003, 7,131,223 B2, and 5,355,599, and U.S. Patent Application Publication No. 2004/0216337. However, each one of these references suffers from one or more of the following disadvantages: they fail to provide a means to restrain the elements of fabric being ironed, they require the use of conventional ironing boards, they are not portable, they are not manufactured from readily available materials, they lack the capability to be self-restraining, or they are not easily manufactured. For the foregoing reasons, there is a need for a pressing mat that restrains elements of fabric being pressed, is portable, may be used integrally with a standard ironing board, is capable of restraining itself, and is easy to manufacture.

SUMMARY

The present invention is directed to a pressing mat that satisfies these needs because it restrains elements of fabric being pressed, is portable, provides a means to restrain itself, is capable of use with a standard ironing board, and is easy to manufacture.

A pressing mat for ironing elements of material that can be placed on a support surface for ironing comprises a pressing board assembly that includes a backing board layer and a composite material layer superimposed adjacent one another and secured together near peripheral edges on each layer. The composite material layer has a foam layer and a fabric layer and is positioned such that the fabric layer is adjacent to the backing board layer with the foam layer providing an exterior surface.

The pressing mat may also be comprised of two pressing board assemblies superimposed adjacent to one another and secured together such that the backing board layers are adjacent to each other and the foam layers provide the exterior surface. In this embodiment, the entire exterior surface of the pressing mat consists of the foam layer.

The pressing mat may also be comprised of two or more pressing mats pivotally attached to each other at one peripheral edge so that the pressing mat can be folded open or and closed in a book-like fashion.

BRIEF DESCRIPTION OF THE DRAWINGS

These and other features, aspects, and advantages of the present invention will become better understood with regard to the following description, appended claims, and accompanying drawings where:

DETAILED DESCRIPTION

According to the present invention, a pressing mat is disclosed. The pressing mat may include one or two pressing board assemblies. In the case of two pressing board assemblies, the pressing board assemblies are securely joined to each other to form a pressing mat. The pressing mat may also include two pressing mats pivotally secured to each other at a peripheral edge to form a book-like configuration. Each pressing board assembly comprises a backing board layer superimposed by a composite material layer. The composite material layer comprises a fabric layer and a foam layer, with the foam layer positioned to serve as the exterior surface of the pressing board assembly and the pressing mat. The foam layer of the pressing mat provides a slip resistant and flame retardant surface that grips, or secures, an element of material that is being pressed using a conventional iron. The slip resistant characteristics of the foam layer enables a person to easily press small pieces of fabric such as those used in quilting.

Figure 1:
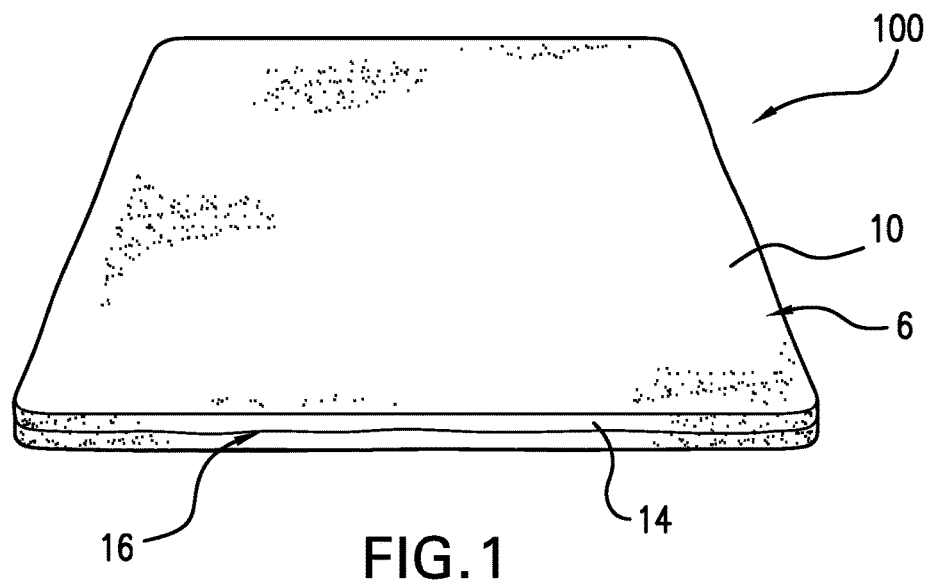
FIG. 1 is a front isometric view of the pressing mat, according to some embodiments.
Figure 2:
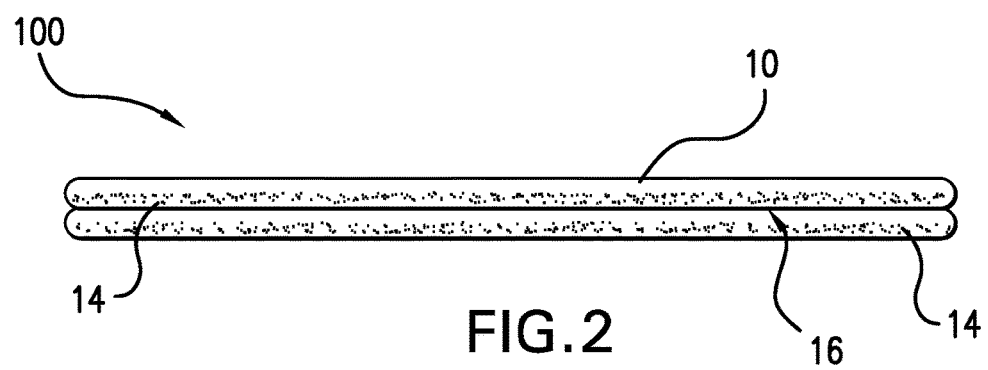
FIG. 2 is a front view of the pressing mat (of FIG. 1), according to some embodiments.
Figure 3:
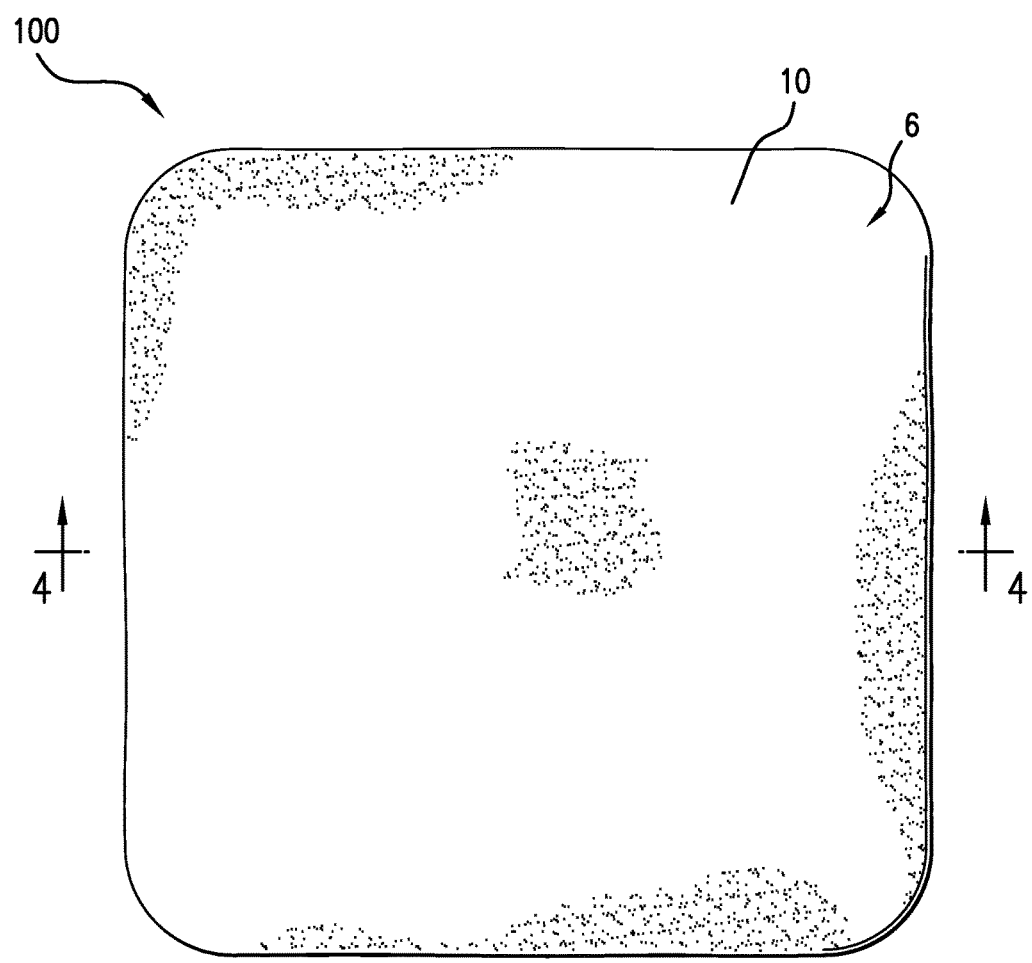
FIG. 3 is a plan view of the pressing mat (of FIG. 1), according to some embodiments.
Figure 4:
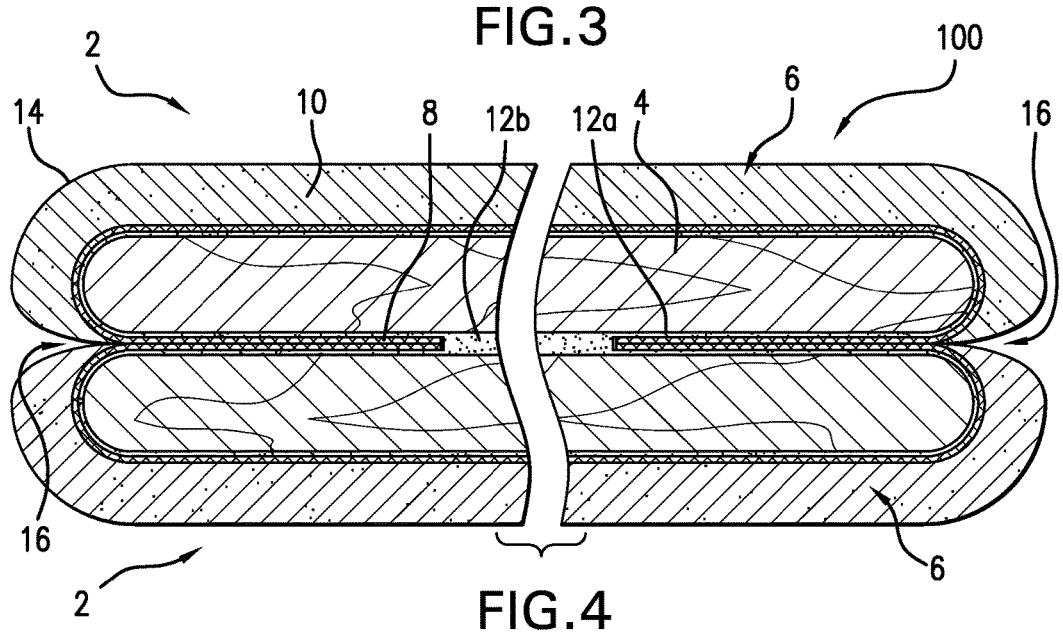
FIG. 4 is a cross-sectional view of the pressing mat (of FIG. 1), according to some embodiments.

A pressing mat 100, is illustrated in FIGS. 1-4. FIG. 1 is a front isometric view of the pressing mat, according to some embodiments. FIG. 2 is a front view of the pressing mat (of FIG. 1), according to some embodiments. FIG. 3 is a plan view of the pressing mat (of FIG. 1), according to some embodiments. FIG. 4 is a cross-sectional view of the pressing mat (of FIG. 1), according to some embodiments.

As shown in FIGS. 1-4, the pressing mat 100 includes two pressing board assemblies 2 that are securely joined together, according to some embodiments. Each pressing board assembly 2 comprises a backing board layer 4 covered with a composite material layer 6. The composite material layer 6 is comprised of a fabric layer 8 and a foam layer 10.

The backing board layer 4 is a rigid wood fiber material that is used to form the structure of the pressing board assembly 2. According to some embodiments, the wood fiber material utilized is commonly referred to as hardboard and is generally available in various density ranges such as 850 to 1000 kg/m3 (low density) or 1000 to 1080 kg/m3 (high density). Either the low density or high density hardboard is sufficient to provide the strength and durability required for this application. However, use of the low density hardboard may reduce the cost of raw materials. The backing board layer 4 may alternatively be constructed of other rigid and durable materials, such as plastics, metals, ceramics, composites, or fiberglass.

The composite material layer 6 comprises a fabric layer 8 and a foam layer 10. The composite material layer 6 is a commercially available material that is commonly used for upholstering headliners in automobiles. The fabric layer 8 is secured to the backing board layer 4 such that the fabric layer 8 is adjacent to the backing board layer 4. The fabric layer 8 may be made of various heat and flame resistant materials, such as nylon.

The foam layer 10 is secured to fabric layer 8. The foam layer 10 may consist of ¼ inch thick polyurethane foam, polyether foam, or other similar material having a similar texture and similar flame retardant characteristics. In some embodiments, a layer of adhesive 12a is used to secure the fabric layer 8 to the backing board layer 4. The layer of adhesive 12a is manufactured by 3M under the trade name 3M Brand Top and Trim Adhesive and is typically used in the automotive industry to secure headliner upholstery. Other adhesives, such as epoxies, glues, and resins, may be utilized to secure the fabric layer 8 to the backing board layer 4.

The composite material layer 6 is superimposed adjacent to the backing board layer 4. On the opposing surface of the backing board layer 4, the composite material layer 6 forms an overlap at the periphery of the backing board layer 4. The overlap of the composite material layer 6 at the periphery of the backing board layer 4 provides an additional means to attach the fabric layer 8 to the backing board layer 4 using adhesive 12a. Other fastening means, such as staples or tacks, may be used alone or in addition to the adhesive 12a to secure the fabric layer 8 to the backing board layer 4.

According to some embodiments, a layer of adhesive 12b is used to secure two pressing board assemblies 2 to each other so that the surfaces of each backing board layer 4 that is not covered by the composite material layer 6 are positioned adjacent to each other resulting in a pressing mat 100. In this embodiment, the entire exterior surface of the pressing mat 100 is covered by the composite material layer 6 and a joint 16 is evident at the interface between the two pressing board assemblies 2. The layer of adhesive 12b used to secure the two pressing board assemblies 2 to each other is manufactured by 3M under the trade name 3M Brand Top and Trim Adhesive. This adhesive is typically used in the automotive industry to secure headliner upholstery. Other adhesives, such as epoxies, glues, and resins, may be utilized to secure the two pressing board assemblies 2 to each other.

According to some embodiments, the pressing mat 100 may be configured with means for folding and unfolding the pressing mat 100 in a book-like manner. This may be accomplished by pivotally attaching two pressing mats 100 at the peripheral edges using hinges, rings, strings, material, or other similar means.

Referring specifically to FIG. 1, the pressing mat 100 is generally square shaped with the exterior surface being the foam layer 10. The foam layer 10 is a slip resistant material that serves multiple purposes. In many applications, the pressing mat 100 is positioned on a surface, such as a table top or counter top. The slip resistant qualities of the foam layer 10 aid in maintaining the position of the pressing mat 100 during the pressing operation. The material that is being pressed is positioned on the exposed side of the foam layer 10. A conventional iron is then used to press the material while the material is held securely in place by the foam layer 10.

The pressing mat 100 can also be used on many support surfaces such as on a standard ironing board, in a person's lap, on a countertop, or on a coffee table. The slip resistant qualities of the pressing mat 100 maintain the position of the pressing mat 100 as well as restrain the element of material that is being pressed.

The previously described versions of the present invention have many advantages. For example, the foam layer 10 provides an ideal surface for pressing fabric that helps maintain the position of the material and allows for a high quality pressing operation. The composite material layer 6 is heat resistant and flame retardant properties. These properties and the porosity of the foam layer 10 enable the composite material layer 6 to remain relatively cool. The pressing mat 100 can also be used as a work board for other crafting projects, such as needlework.

Yet another advantage of the pressing mat 100 is that it is portable and capable of use in a variety of environments. The size and shape of the pressing mat 100 can be varied as needed for different applications. For portable applications, the pressing mat 100 can be small (i.e. 15"×15") and for other home based applications, the pressing mat 100 can be large (i.e. 18"×24" or larger). The ability to configure the pressing mat 100 in a book-like manner provides additional flexibility because it provides a means to vary the size and shape of the pressing mat 100 for stowage, transportation, and portable use. Also, the slip resistant qualities of the foam layer 10 allow the pressing mat 100 to be used on hard, slick surfaces, such as a table.

Another advantage of the pressing mat 100 is that it is easy to manufacture. The materials needed to construct the pressing mat 100 are readily available and it is designed for easy assembly.

It is also advantageous that the pressing mat 100 can be used in connection with a standard ironing board or adapted to serve as an ironing board cover for a standard ironing board.

While the invention has been described with respect to a limited number of embodiments, those skilled in the art will appreciate numerous modifications and variations therefrom. The invention does not require that all the advantageous features and all the advantages need to be incorporated into every embodiment of the invention. It is intended that the appended claims cover all such modifications and variations as fall within the true spirit and scope of the invention. Any element in a claim that does not explicitly state "means for" performing a specified function is not to be interpreted as a "means" clause as specified in 35 U.S.C. §112, 116.

What is claimed is:

1. A pressing mat that secures elements of fabric being ironed for quilting or crafts that require the use of an iron and work station for keeping elements secured, the pressing mat comprising:
a pressing board assembly including a backing board layer and a composite material layer that are superimposed adjacent one another and secured together at least adjacent the peripheral edges thereof, the composite material layer comprising a foam layer and a fabric layer and being positioned such that the fabric layer is adjacent to the backing board layer and foam of the foam layer serves as a top exterior planar surface of the pressing board assembly and the foam and fabric layers cover the lateral edges of the pressing board assembly and the backing board layer serves as a bottom exterior planar surface of the pressing board assembly.

2. The pressing mat claim 1 wherein the backing board layer is an ironing board.

3. The pressing mat claim 1 wherein the composite material layer is secured to the backing board layer using an adhesive.

4. The pressing mat as recited in claim 1 wherein the pressing mat is of a generally rectangular configuration having a pair of end portions and a pair of side portions, the end portions having a length dimension that is not greater than two thirds the length dimension of the side portions.

5. The pressing mat as recited in claim 1 wherein the pressing mat is of a generally square configuration having a four side portions, each having equal length dimensions.

6. The pressing mat as recited in claim 1 wherein the composite material layer is secured to the backing board layer at the peripheral edges using staples.

7. The pressing mat as recited in claim 1 wherein the composite material layer is secured to the backing board layer at the peripheral edges using tacks.

8. The pressing mat as recited in claim 1 wherein the composite material layer is secured to the backing board layer at the peripheral edges using adhesive.

9. The pressing mat as recited in claim 1 wherein the composite material layer is secured to the backing board layer at the peripheral edges using adhesive and staples.

10. A pressing mat that secures elements of fabric being ironed for quilting or crafts that require the use of an iron and work station for keeping elements secured, the pressing mat comprising:
two pressing board assemblies, each pressing board assembly including a backing board layer and a composite material layer that are superimposed adjacent one another and secured together at least adjacent the peripheral edges thereof, the composite material layer compromising a foam layer and a fabric layer and being positioned such that the fabric layer is adjacent to the backing board layer and foam of the foam layers serves as top exterior planar surfaces of the pressing board assemblies and the foam and fabric layers cover the lateral edges of the pressing board assemblies and the backing board layers serve as bottom planar surfaces of the pressing board assemblies and the two pressing board assemblies being superimposed adjacent to one another and secured together such that the backing board layers are adjacent to each other and the foam layers serve as top and bottom exterior planar surfaces and lateral edges of the pressing mat.

11. The pressing mat claim 10 further comprising a means for folding the pressing mat.

12. The pressing mat as recited in claim 10 wherein the two pressing board assemblies are secured to each other using an adhesive.

13. The pressing mat as recited in claim 10 wherein the pressing mat is of a generally rectangular configuration having a pair of end portions and a pair of side portions, the end portions having a length dimension that is not greater than two thirds the length dimension of the side portions.

14. The pressing mat as recited in claim 10 wherein the pressing mat is of a generally square configuration having a four side portions, each having equal length dimensions.

15. The pressing mat as recited in claim 10 wherein the composite material layers are secured to the respective backing board layers at the peripheral edges using staples.

16. The pressing mat as recited in claim 10 wherein the composite material layers are secured to the respective backing board layers at the peripheral edges using tacks.

17. The pressing mat as recited in claim 10 wherein the composite material layers are secured to the respective backing board layers at the peripheral edges using adhesive.

18. The pressing mat as recited in claim 10 wherein the composite material layers are secured to the respective backing board layers at the peripheral edges using adhesive and staples.

\* \* \* \* \*